United States Patent
Jang et al.

(10) Patent No.: US 9,515,898 B2
(45) Date of Patent: Dec. 6, 2016

(54) METHOD AND SYSTEM FOR INFORMATION PROCESSING FOR RECEIVING PLACE INFORMATION AND RECORDING MEDIUM FOR THE SAME

(75) Inventors: Jun ho Jang, Seongnam-si (KR); Tae hyung Park, Seoul (KR)

(73) Assignee: INFOBANK CORP., Seongnam-si, Gyeonggi-do (KR)

(*) Notice: Subject to any disclaimer, the term of this patent is extended or adjusted under 35 U.S.C. 154(b) by 291 days.

(21) Appl. No.: 14/235,030

(22) PCT Filed: Jul. 24, 2012

(86) PCT No.: PCT/KR2012/005891
§ 371 (c)(1),
(2), (4) Date: Jan. 24, 2014

(87) PCT Pub. No.: WO2013/015598
PCT Pub. Date: Jan. 31, 2013

(65) Prior Publication Data
US 2014/0195665 A1  Jul. 10, 2014

(30) Foreign Application Priority Data
Jul. 26, 2011 (KR) ........................ 10-2011-0074253

(51) Int. Cl.
*H04W 4/02* (2009.01)
*H04L 12/24* (2006.01)
(Continued)

(52) U.S. Cl.
CPC ................ *H04L 41/50* (2013.01); *H04W 4/02* (2013.01); *H04W 4/025* (2013.01); *H04W 4/04* (2013.01); *H04W 8/06* (2013.01)

(58) Field of Classification Search
CPC .......... H04W 4/02; H04W 4/025; H04W 4/04; H04W 8/06; H04L 63/105; H04L 51/20; H04L 12/588; G06Q 30/02; G06Q 30/0241; G06Q 30/00; G01S 5/0252
See application file for complete search history.

(56) References Cited

U.S. PATENT DOCUMENTS

2002/0176579 A1* 11/2002 Deshpande ........... H04L 63/105
380/270
2004/0249915 A1* 12/2004 Russell ................. G01S 5/0252
709/223
(Continued)

FOREIGN PATENT DOCUMENTS

JP  2000-341736 A  12/2000
KR  10-1998-0086329 A  12/1998
(Continued)

*Primary Examiner* — Le Luu
(74) *Attorney, Agent, or Firm* — Novick, Kim & Lee, PLLC; Sang Ho Lee

(57) ABSTRACT

The present invention relates to an information processing method and system, and a recording medium for the same. An information processing system includes a place terminal side transceiver for receiving place identification information and network ID information set to a communication network device disposed in a place from a terminal disposed in the place; a storing section for storing the connections among at least one place identification information per a place, the network ID information set to the communication network device disposed in each place, and place information corresponding to each place into a storing medium(1); a wireless terminal side transceiver for receiving identification information of a wireless terminal and communication network ID information accessed with the wireless terminal through an application equipped in a user's wireless terminal; an information checking section for firstly checking the network ID information to be matched with the communication network ID information received by the wireless terminal side transceiver through the storing medium(1), and
(Continued)

secondly checking at least one of the place identification information and place information connected to the firstly checked network ID information; a registering requesting section for transmitting at least one of the place identification information and the place information checked through the information checking section by the application equipped in the wireless terminal and requesting automatic output registration of place information for the place; and a registering processing section for processing to register and store the identification information of the wireless terminal connectively with at least one of the place identification information and the network ID information set to the communication network device disposed in the place into a storing medium(2), if registration-approval information corresponding to the automatic output registration request through the registering requesting section is received by the application equipped in the wireless terminal.

20 Claims, 9 Drawing Sheets

(51) Int. Cl.
*H04W 8/06* (2009.01)
*H04W 4/04* (2009.01)

(56) References Cited

U.S. PATENT DOCUMENTS

| | | | | |
|---|---|---|---|---|
| 2007/0287473 | A1* | 12/2007 | Dupray | H04W 4/02 455/456.1 |
| 2008/0171559 | A1* | 7/2008 | Frank | G06Q 30/02 455/456.5 |
| 2009/0215469 | A1* | 8/2009 | Fisher | H04L 12/588 455/456.3 |
| 2010/0150122 | A1* | 6/2010 | Berger | H04W 4/02 370/338 |
| 2010/0291907 | A1* | 11/2010 | MacNaughtan | G06Q 30/0241 455/414.1 |
| 2012/0019365 | A1* | 1/2012 | Tuikka | G06Q 30/02 340/10.1 |
| 2012/0022944 | A1* | 1/2012 | Volpi | G06Q 30/00 705/14.53 |
| 2012/0314625 | A1* | 12/2012 | Bruce | H04L 51/20 370/259 |

FOREIGN PATENT DOCUMENTS

| | | |
|---|---|---|
| KR | 2003-0015624 A | 2/2003 |
| KR | 10-2004-0072530 A | 8/2004 |
| KR | 10-2006-0031920 A | 4/2006 |

* cited by examiner

| STORING SECTION (105) ||||| |
|---|---|---|---|---|
| WIRELESS TERMINAL IDENTIFICATION INFORMATION | COMMUNICATION NETWORK ID | PLACE IDENTIFICATION INFORMATION | PLACE INFORMATION | ... |
| 010-1234-5678 | AAACOFFEE44 | COFFEE SHOP A | MENU CONFIGURATION, DISCOUNT COUPON | ... |
| | HP44AE23 | CHURCH S | WORSHIP PROGRAM, HYMN, ETC. | |
| | INFOBANK-14F | INFOBANK | ORGANIZATION CHART, SERVICE MENU | |
| 010-3933-4444 | ARTPLACE24 | THE ARTS CENTER | BOOKING MENU, PRESENT PORTFOLIO, ETC. | ... |
| | PPOOEE | DEPARTMENT STORE H | FLOOR MENU, DISCOUNT INFORMATION | |
| | SEOKYO44HE | SEKYO ELEMENTARY SCHOOL | GUIDE, EDUCATION PROGRAM, ETC. | |
| ... | ... | ... | ... | ... |

FIG. 3 ically the invention is that it and a
METHOD AND SYSTEM FOR INFORMATION PROCESSING FOR RECEIVING PLACE INFORMATION AND RECORDING MEDIUM FOR THE SAME

BACKGROUND OF THE INVENTION

1. Technical Field

The present invention relates to a method and system, and a recording medium for registering ID set to a communication network device disposed in a place visited by a user's wireless terminal into the applications disposed in the user's wireless terminal or an information processing server on a communication network.

2. Description of the Related Art

With the prevalence of a smart phone to be supported with wireless Internet in recent years, users requests various place information for visiting places using a wireless terminal such as a user's smart phone to portal sites by keyword search on visiting the specific place and then outputs many place information to a screen by search results.

However, a using method of the search results through such a wireless Internet portal site has inconvenience that should input search keywords for visiting places after the user in full accesses the portal site and that again should search the search results, that the user wants, of many search results outputted through the portal site, or an operator of the corresponding place expects that the user searches the corresponding place information by the search results after registering place information that want to be provided to the user visiting the places into the portal site, but there are no means that may directly provide the place information, that the operator of the place wants, to the user' wireless terminal.

SUMMARY OF THE INVENTION

An advantage of some aspects of the invention is that it provides an information processing method and system, and a recording medium capable of receiving in real time the place information for the place visited by the user without separable searches and receiving the received place information as information having high practicality, that the operator of the corresponding place want to provide, by registering ID set to a communication network device disposed in the places visited by a user's wireless terminal into applications disposed in the user's wireless terminal or an information processing server on a communication network According to an aspect of the invention, there is provided an information processing system including a place terminal side transceiver for receiving place identification information and network ID information set to a communication network device disposed in a place from a terminal disposed in the place; a storing section for storing the connections among at least one place identification information per a place, the network ID information set to the communication network device disposed in each place, and place information corresponding to each place into a storing medium(1); a wireless terminal side transceiver for receiving identification information of a wireless terminal and communication network ID information accessed with the wireless terminal through an application equipped in a user's wireless terminal; an information checking section for firstly checking the network ID information to be matched with the communication network ID information received by the wireless terminal side transceiver through the storing medium(1), and secondly checking at least one of the place identification information and place information connected to the firstly checked network ID information; a registering requesting section for transmitting at least one of the place identification information and the place information checked through the information checking section by the application equipped in the wireless terminal and requesting automatic output registration of place information for the place; and a registering processing section for processing to register and store the identification information of the wireless terminal connectively with at least one of the place identification information and the network ID information set to the communication network device disposed in the place into a storing medium(2), if registration-approval information corresponding to the automatic output registration request through the registering requesting section is received by the application equipped in the wireless terminal.

According to another aspect of the invention, there is provided an information processing system including a place terminal side transceiver for receiving place identification information and network ID information set to a communication network device disposed in a place from a terminal disposed in the place; a storing section for storing the connections among at least one place identification information per a place, the network ID information set to the communication network device disposed in each place, and place information corresponding to each place into a storing medium; a wireless terminal side transceiver for receiving identification information of a wireless terminal and communication network ID information accessed with the wireless terminal through an application equipped in a user's wireless terminal; an information checking section for firstly checking the network ID information to be matched with the communication network ID information received by the wireless terminal side transceiver through the storing medium, and secondly checking at least one of the place identification information and place information connected to the firstly checked network ID information; a registering requesting section for transmitting at least one of the place identification information and the place information checked through the information checking section by the application equipped in the wireless terminal and requesting automatic output registration of place information for the place on the application; and a registering processing section for processing to register and store at least one of the place identification information and the network ID information set to the communication network device disposed in the place on the application equipped in the wireless terminal, if registration-approval information corresponding to the automatic output registration request through the registering requesting section is received by the application equipped in the wireless terminal.

According to another aspect of the invention, there is provided an information processing method including receiving, on a server, place identification information and network ID information set to communication network device disposed in a place from a terminal disposed in the place; storing, on the server, the place identification information and the network ID information set to the communication network device disposed in the place, connected to place information corresponding to the place into a storing medium(1); checking communication network ID information accessed with a user's wireless terminal in an application equipped in the user's wireless terminal; discriminating whether the network ID information checked in the application is the network ID information already registered by automatic place information output; automatically outputting the place information corresponding to the place when the network ID information checked in the application is the network ID information already registered by automatic place information output, transmitting the identification information for the wireless terminal and network ID information to the server when the network ID information checked in the application is not the network ID information already registered by automatic place information output in the application; checking, in the server, the network ID information to be matched with the network ID information transmitted by the application through the storing medium (1), and checking the at least one of place identification information and place information connected to the checked network ID information; requesting, in the server, automatic place information output registration for the place after transmitting at least one of the checked place identification information and place information from a server to the applications; and processing the automatic place information output registration for the place in the application.

According to another aspect of the invention, there is provided an information processing method including storing place identification information and network ID information set to communication network device disposed in a place, connected to place information corresponding to the place into a storing medium(1); checking the network ID information to be matched with the network ID information transmitted by an application equipped in a user's wireless terminal through the storing medium(1), and checking at least one of the place identification information and place information connected to the checked network ID information on receiving identification information of the wireless terminal and the network ID information through the application; and requesting automatic place information output registration for the place after transmitting at least one of the checked place identification information and place information from a server to the applications.

According to another aspect of the invention, there is provided an information processing method including checking communication network ID information accessed with a user's wireless terminal in an application equipped in the user's wireless terminal; discriminating whether the network ID information checked in the application is the network ID information already registered by automatic place information output; automatically outputting the place information corresponding to the place when the network ID information checked in the application is the network ID information already registered by automatic place information output, transmitting the network ID information to the server when the network ID information checked in the application is not the network ID information already registered by automatic place information output in the applications; outputting, in the application, one or more place identification information and place information corresponding to the network ID information received from the server on the screen, and requesting automatic place information output registration for the place to a user; and processing the automatic place information output registration for the place after checking the user's approval result for automatic place information output registration input by using a key input means in the application.

BRIEF DESCRIPTION OF THE DRAWINGS

The following drawing drawings attached to the present specification illustrates an exemplary embodiment of the invention, and serves to further understand the technical idea of the invention along with a detailed description of the invention. Therefore, the invention is not limited to matters described in the drawings.

FIG. 3 shows one embodiment for a storing medium according to another embodiment of the present invention.

DESCRIPTION OF THE PREFERRED EMBODIMENTS

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Therefore, the detailed description of the present invention does not intend to limit the present invention to the disclosed embodiments. Further, it should be appreciated that the appended claims include even another embodiment. The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention. Therefore, the configurations described in the embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application.

Figure 1:
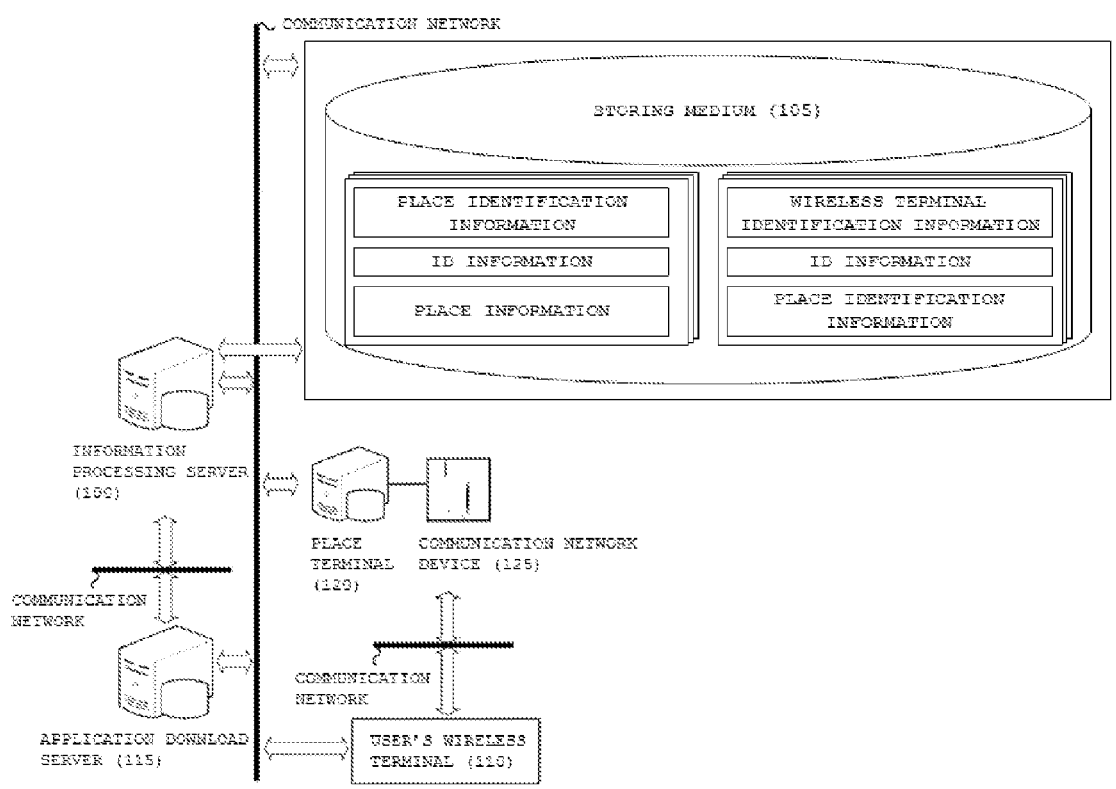
FIG. 1 shows configurations of an information processing system according to an embodiment of the present invention.

FIG. 1 shows configurations of an information processing system according to an embodiment of the present invention.

FIG. 1 shows that the information processing system including an information processing server 100 and a storing medium 105 is connected to a user's wireless terminal 110, a place terminal 120 and a application download server 115 through a communication network. In addition, it shows the configurations for registering communication network ID accessed with the user's wireless terminal 110 into applications or an information processing server 100 disposed in the user's wireless terminal 110.

The information processing system in an embodiment of the present invention may have various configurations according to the embodiments and communication network connecting schemes.

Firstly, the information processing server 100 is directly or connected to the storing medium 105, the information processing server 100 is indirectly connected to the storing medium 105 through the communication network, and the connections among the information processing server 100, the storing medium 105, the user's wireless terminal 110 and the place terminal 120 may be variously configured by one skilled in the art although not separately shown in the drawing.

An important configuration of the information processing system according to the present invention, that is, the information processing server 100 is connected to the user's wireless terminal 110 and the place terminal 120 through the communication network, and registers ID set to a communication network device 125 disposed in places, visited by the user's wireless terminal 110, into the applications or the storing medium 105 disposed in the user's wireless terminal 110.

Further, the information processing server 100 receives identification information of the wireless terminal 110 and communication network ID information accessed with the wireless terminal 110 through the applications disposed in the user's wireless terminal 110 when the user's wireless terminal 110 revisits the place recognized by an automatic place information output, checks the place information connected to network ID information to be matched with the received communication network ID information through the storing medium 105, and outputs the checked place information to the user's wireless terminal 110.

The information processing system according to an embodiment of the present invention includes the information processing server 100 and storing medium 105, but may include the information processing server 100 only in the case that the storing medium 105 is located on an external communication network.

The storing medium 105 includes a first storing medium 105 for connecting and storing at least one place identification information per a place received from the place terminal 120 disposed in each place and the network ID information set to the communication network device 125 disposed in each place into the place information corresponding to each place, and a second storing medium 105 for connecting and storing the identification information for the wireless terminal 110 transmitted through the applications disposed in the user's wireless terminal 110 into the place identification information and/or the network ID information set to the communication network device 125 disposed in the place after recognizing automatic place information output registration by a user.

Wherein, the place identification information means information, such as place names, for identifying the corresponding place, and the identification information of the wireless terminal 110 means information, such as telephone numbers for the wireless terminal 110, for identifying the wireless terminal 110.

In addition, the places of the present invention include at least one of marts, department stores, retail stores, schools, churches, cathedrals, temples, gymnasiums, theaters, playgrounds, public agencies, hospitals, funfair, amusement parks, accommodations, car repair shops, museums and exhibition halls, and may include all places, disposed with the communication network device 125, except the places described above by one skilled in the art.

In addition, the place information in the present invention includes at least one of place abstract information, place guide map information, information page link information for the place, place information storage location information, various menu information provided from the place, various content information provided from the place, promotion information for the place, event information at the place, advertisement information to be outputted inside the place information or to a upper or lower region outputted with the place information, and ticket or coupon information available at the place, and may include all information provided by place providers.

The communication network ID in the present invention may include communication network IP information or IP address, and may include password information on requesting password inputs when the wireless terminal is accessed.

Further, the place information produced by an operator of the place is provided to the information processing server 100 through the place terminal 120, or may be directly produced by the operator of the information processing server 100, and the place information outputted through the user's wireless terminal 110 may be configured in a mobile web type or mobile application type.

There are the first storing medium 105 and second storing medium 105 to describe the embodiments of the present, and it is possible to configure it as a single database type by one skilled in the art. In such a case, at least one place identification information per a place, the network ID information set to the communication network device 125 disposed in each place, and the place information corresponding to each place, on a single storing medium 105, are connected to and stored into the identification information of the wireless terminal 110, obtaining the automatic place information output approval, for each place.

In addition, the second storing medium 105 is disposed in the information processing system or servers on the communication network, or the user's wireless terminal 110, and memory 460 of the user's wireless terminal 110 stores lists in which the network ID information per each place and the place information per each place, recognized by the user by the automatic place information output, are connected.

A application download server 115 of the present invention registers the applications, such as app store or T store, for the user's wireless terminal 110 through the information processing server 100, and then distributes the registered applications into the user's wireless terminal 110.

Although not shown in the drawing in detail in the embodiments of the present invention, when the applications are provided to the user's wireless terminal 110, it is possible to download the applications from the information processing server 100 to the user's wireless terminal 110 directly, except through the application download server 115.

Wherein, the applications are a kind of program disposed in the user's wireless terminal 110, and therefore the applications and programs, having the same meanings, may be mixed.

The communication network in the present invention means a local area network such as Wi-Fi communication network, and one skilled in the art may change the range of the communication network from local area to long area or may extend the range of the communication network into mobile networks.

The communication network device 125 in the present invention performs the role of an access point connecting the user's wireless terminal 110 and the communication network, and provides ID of the communication network device 125 to the user's wireless terminal 110.

The place terminal 120 in the present invention includes at least one of PC or POS connected to the communication network device 125 or a smartphone or a tablet PC that belongs to the place operator.

Figure 2:
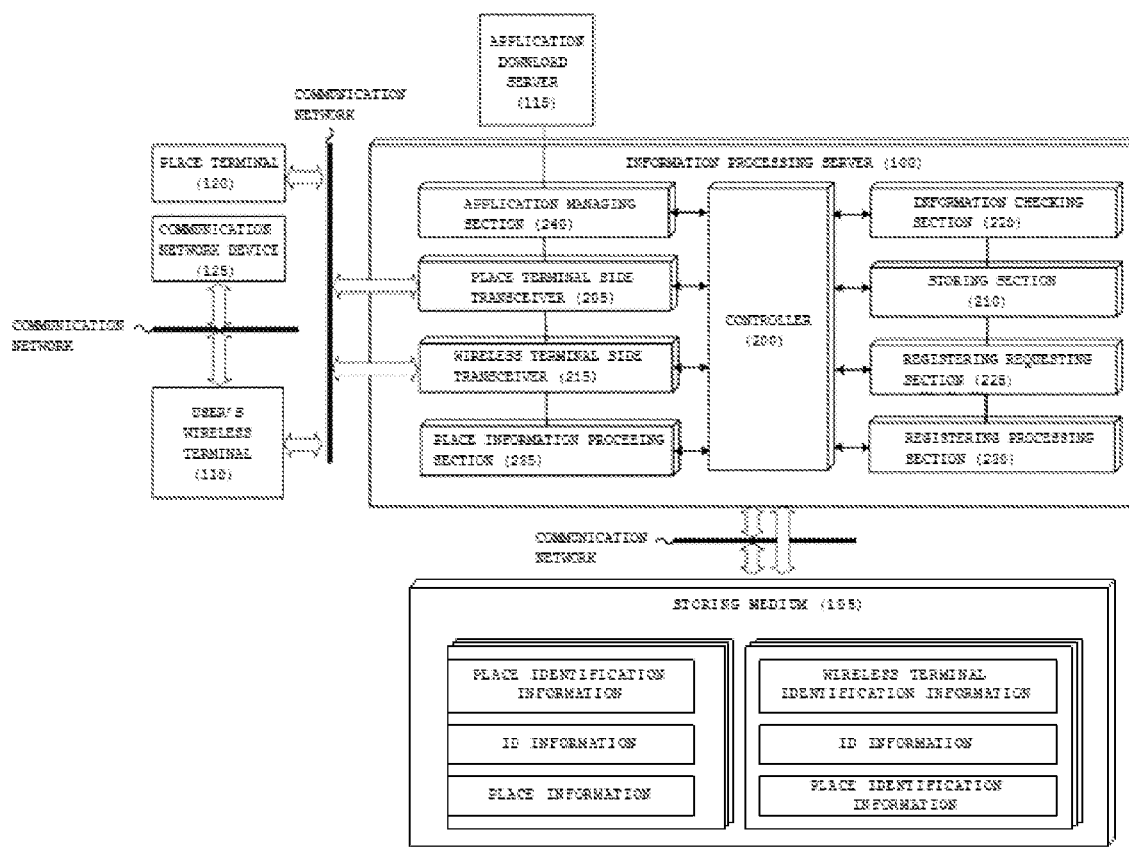
FIG. 2 shows sub-configurations of an information processing server according to an embodiment of the present invention.

FIG. 2 shows sub-configurations of the information processing server 100 according to an embodiment of the present invention.

FIG. 2 shows sub-configurations of the information processing server 100 on the information processing system shown in FIG. 1, each configuration is to describe an embodiment of the present invention, and the present invention is not limited to the embodiment only shown in FIG. 2.

Referring to FIG. 2, the information processing server 100 according to the embodiments of the present invention includes a application managing section 240, a place terminal side transceiver 205, a wireless terminal side transceiver 215, a place information processing section 235, an information checking section 220, a storing section 210, a registering requesting section 225, a registering processing section 230, and a controller 200 for controlling the above configurations.

The information processing server 100 is shown as a single server in the drawing for the description of the embodiments, but each means or configuration may be separated into at least one server.

The application managing section 240, disposed in the user's wireless terminal 110, according to an embodiment of the present invention registers automatic place information output for the places when the user's wireless terminal 110 visits the corresponding places, manages the applications processing the automatic place information output on revisiting the corresponding places, registers the applications of the present invention into the application download server 115 on the communication network, distributes the applications into the user's wireless terminal 110, or directly downloads the applications into the user's wireless terminal 110.

The place terminal side transceiver 205 according to an embodiment of the present invention receives place identification information from the place terminal 120 disposed in the place, and network ID information set to the communication network device disposed in the place.

The place terminal side transceiver 205 may further receive the place information that wants to be provided into the user's wireless terminal 110 by the operator of the place from the place terminal 120.

For example, when the corresponding places is a coffee shop A, the place terminal side transceiver 205 receives the identification information in the coffee shop A, that is, information in the coffee shop A, and information AAACOFFEE44 that is the ID of the communication network device 125 disposed in the coffee shop A through PC or POS disposed in the coffee shop A or the smart phone or the tablet PC, etc. that belongs to the operator of the coffee shop A, and further receives the place information, that is, menu configuration and discount coupon information in the coffee shop A that want to be provided into the user's wireless terminal 110 by the operator of the coffee shop A from case to case.

Then, the place terminal side transceiver 205 further receives the network ID information set to the communication network device 125 disposed in the place, and changed information such as the place information, the place identification information, etc. corresponding to each place.

In addition, the place terminal side transceiver 205 transmits various data or information to the place terminal 120.

The storing section 210 according to an embodiment of the present invention stores at least one place identification information per the place receiving from each place terminal 120, the network ID information set to the communication network device 125 disposed in each place, and the place information corresponding to each place, connected by the place terminal side transceiver 205, into the storing medium 105.

Then, the storing section 210 changes and stores the network ID information set to the communication network device 125 disposed in the place, the place information corresponding to each place, and changed information received through the place terminal side transceiver 205 whenever the place identification information changes, into the storing medium 105.

The place information produced by the operator of the place is provided to the information processing server 100 through the place terminal 120, or may be directly produced by the operator of the information processing server 100.

The wireless terminal side transceiver 205 according to an embodiment of the present invention receives the identification information of the wireless terminal 110, and the communication network ID information accessed with the wireless terminal 110 through the applications disposed in the user's wireless terminal 110.

That is, the wireless terminal side transceiver 205 checks the communication network ID information accessed with the wireless terminal 110 in the applications disposed in the user's wireless terminal 110, and receives the network ID information and the identification information of the wireless terminal 110 on transmitting them in the case that the checked network ID information is not discriminated as the network ID information already registered by the automatic place information output.

The wireless terminal side transceiver 205 may receive the communication network ID information only accessed with the wireless terminal 110 through the applications disposed in the user's wireless terminal 110 in another embodiment.

Then, the wireless terminal side transceiver 205 receives registration-approval information corresponding to automatic place information output registration request through the applications disposed in the user's wireless terminal 110.

In addition, the place terminal side transceiver 205 transmits various data or information to the wireless terminal 110.

The place terminal side transceiver 205 and the wireless terminal side transceiver 215 are shown in a separable configuration in FIG. 2 to describe an embodiment of the present invention, but they may be configured as a single transceiver.

The information checking section 220 in the embodiment of the present invention firstly checks the network ID information to be matched with the communication network ID information received by the wireless terminal side transceiver 215 through the first storing medium 105, and secondly checks at least one of the place identification information and place information connected to the firstly checked network ID information.

The information checking section 220 checks the place identification information only connected to the network ID information, the place information only connected to the network ID information, and the place identification information and place information connected to the network ID information, according to an embodying scheme.

The registering requesting section 225 in the embodiment of the present invention transmits at least one of the place identification information and place information checked through the information checking section 220 to the applications disposed in the wireless terminal 110 through the wireless terminal side transceiver 215 and therefore requests the automatic place information output registration for the place to the applications.

The registering requesting section 225 may transmit the place identification information only, the place information only, and the place identification information and the place information, checked through the information checking section 220 to the applications disposed in the wireless terminal 110, by one skilled in the art.

The registering processing section 230 in the embodiment of the present invention registers and stores the network ID information set to the communication network device 125, disposed in the place identification information or the places, or the network ID information set to the communication network device 125, disposed in the place identification information and the places, connected to the identification information of the wireless terminal 110 into the second storing medium 105, or registers and stores the network ID information set to the communication network device 125, disposed in the place identification information or the places, or the network ID information set to the communication network device 125, disposed in the place identification information and the places into the applications disposed in the wireless terminal 110, when the registration-approval information corresponding to the automatic place information output registration request through the registering requesting section 225 is received through the wireless terminal side transceiver 215 by the applications disposed in the wireless terminal 110.

The registering processing section 230 is connected to the applications disposed in the wireless terminal 110 through the communication network, then requests so that at least one information of the place identification information and the network ID information set to the communication network device 125 disposed in the places into the automatic place information output network ID lists managed by the applications is stored, and requests so that the place information is further stored from case to case.

The place information processing section 235 in the embodiment of the present invention checks at least one of the place identification information and the network ID information connected to the identification information of the wireless terminal 110 through the second storing medium 105 and then outputs the place information, corresponding to the places, connected to the network ID information or the place identification information to the wireless terminal 110 through the first storing medium 105, when the identification information of the wireless terminal 110 and the communication network ID information accessed with the wireless terminal 110 are received through the wireless terminal side transceiver 215 by the applications disposed in the user's wireless terminal 110 revisiting the place.

The place information processing section 235 is connected to the applications disposed in the user's wireless terminal 110 through the communication network and then outputs the place information corresponding to the revisited place to the wireless terminal 110 through the applications, when the user's wireless terminal revisits the places, from case to case.

Although not separately shown in the drawing, the information processing server 100 in the present invention further include an information changing section for changing the network ID information or the place identification information stored into the first storing medium 105 and the second storing medium 105 or the applications, when the network ID information or the place identification information set to the communication network device 125 disposed in the place changes.

In such a case, the information changing section changes and stores the network ID information set to the communication network device 125 disposed in the place, the place information corresponding to each place, and changed information received through the place terminal side transceiver 205 whenever the place identification information changes, into the storing medium through the storing section 210, or transmits information changed by the applications disposed in the wireless terminal 110 in conjunction with the place terminal side transceiver 205, and therefore requests the changing of the automatic place information output network ID information lists managed by the applications.

In the present invention, at least one configuration of each configuration disposed in the information processing server 100 is configured by 1 to 3 programs.

FIG. 3 shows one embodiment for the storing medium 105 according to another embodiment of the present invention.

Referring to FIG. 3, the identification information of the wireless terminal 110 are connected to ID in the communication network device 125 disposed in the place, the place identification information, and the place information, the connected those are stored, and the identification information of the wireless terminal 110 and the place identification information may be omitted by one skilled in the art.

The storing medium 105 of the present invention is disposed in the information processing server 100, or is directly connected to the information processing server 100, is disposed in the place terminal 120 and therefore is connected to the information processing server 100, or is disposed in the memory 460 within the wireless terminal 110.

That is, one of embodiments of the present invention, that is, in case of registering the automatic place information output into the storing medium 105 on the information processing server 100, the storing medium 105 stores the ID in the communication network device 125 disposed in the places, the place identification information and the place information, connected to the identification information of the wireless terminal 110. one of another embodiments of the present invention, that is, in case of registering the automatic place information output into the automatic place information output network ID information lists managed by the applications within the wireless terminal 110, the storing medium 105 on the information processing server 100 stores the ID in the communication network device 125, the place identification information and the place information only, and may store the ID in the communication network device 125, the place identification information and the place information into the automatic place information output network ID information lists managed by the applications within the wireless terminal 110.

Figure 4:
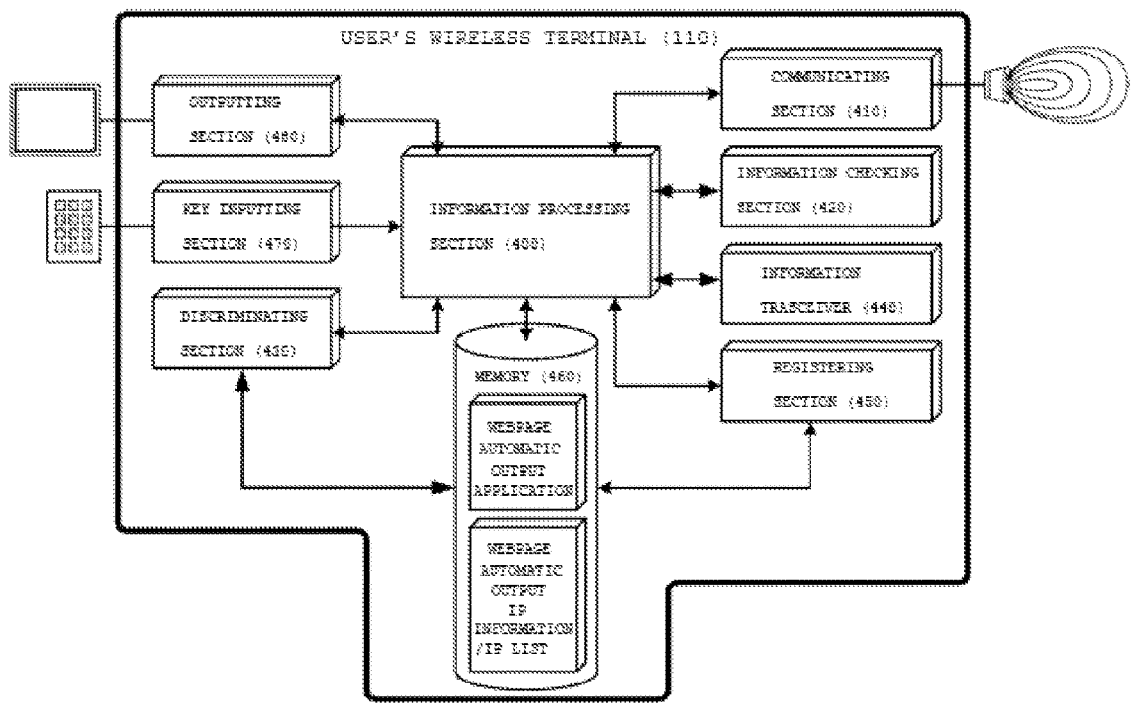
FIG. 4 shows sub-configurations of a user's wireless terminal according to further another embodiment of the present invention.

FIG. 4 shows sub-configurations of the user's wireless terminal 110 according to further another embodiment of the present invention.

The wireless terminal 110, shown in FIG. 4, to be operated on a mobile communication system is used for information processing, the detailed showing is omitted in the drawing, but the wireless terminal 110 externally includes a body, a speaker, a microphone, a keypad, LCD (Liquid Crystal Display), an antenna, and a battery, etc. in hardware aspect, and internally includes CDMA (Code Division Multiple Access) modem, CPU/MPU (Central Processing Unit/Micro Processing Unit), the predetermined modem chip containing the function of a vocoder, etc. (for example, MSM series modem chip made by Qualcomm in U.S.A.), a kind of memory element, a duplex filter for separating transmitting and receiving signals at one antenna, a power Amp for amplifying transmitting signal, HPA ((High Power Amplifier), an isolator for preventing the phenomenon returning high power transmitting signal, a RF/IF SAW filter for removing spurious signal except the desired band, a frequency up-circuit at a transmission path, a frequency down-conversion circuit at a receipt path, VCTCXO (Voltage Controlled Temperature Compensated X-tal Oscillator) corresponding to a basic cluck source, an UHF frequency synthesizer for generating frequency up and down-converted local signal, and a codec chip for converting analog audio signal into digital signal, and includes all the functions and configurations of the wireless terminal to be developed hereafter.

Preferably, principal configurations of the wireless terminal 110, according to the present invention, referencing the above-described hardware characteristics includes an information processing section 400, a memory 460 for storing automatic place information output applications and automatic place information output ID lists, an outputting section 480, a key inputting section 470, a discriminating section 430, a communicating section 410, an information checking section 420, an information transceiver 440, and a registering section 450 as shown, and each configuration may be added or excluded according to kinds and characteristics of the wireless terminal 110.

Referring to FIG. 4, the memory 460 stores the automatic place information output applications and automatic place information output ID lists, and may further store the place identification information on the automatic place information output ID lists and/or the place information corresponding to the ID in the place communication network device 125, although not separately shown in the drawing, from case to case.

The automatic place information output ID lists stores the place identification information per a place and the automatic place information output network ID information for each place, and further connects and therefore stores the place information corresponding to each place, from case to case.

The memory 460, which is a collective name of memory elements for storing a predetermined program routine (or code) and/or program data (for example, information and/or data inputted and outputted when operations by the program routine (or code) is performed) for controlling whole operations of the wireless terminal 110, includes ROM (Read Only memory) corresponding to read only memory, readable/writable Flash Memory (FM), and EEPROM (Electrically Erasable and Programmable Read Only Memory), etc.

The communicating section 410 in the embodiment of the present invention connects the communication network between the user's wireless terminal 110 and the communication network device 125 disposed in the place visited by the user.

The communication network means a local area network such as Wi-Fi communication network, and one skilled in the art may change the range of the communication network from local area to long area or may extend the range of the communication network into a mobile network.

The information checking section 420 in the embodiment of the present invention checks the communication network ID information accessed with the wireless terminal 110 through the communicating section 410 at a current place.

The information checking section 420 in the embodiment of the present invention checks the network ID information set through Wi-Fi setting applications in conjunction with the Wi-Fi setting applications disposed in the wireless terminal 110, and therefore may check the communication network ID information accessed with the wireless terminal 110 at current place.

The discriminating section 420 in the embodiment of the present invention discriminates whether the network ID information checked through the information checking section 420 is the network ID information already registered by the automatic place information output.

In this case, the discriminating section 420 compares the network ID on the automatic place information output already stored into the memory 460 with the network ID checked through the information checking section 420, and therefore discriminates the network ID information checked through the information checking section 420 as the network ID information already registered by the automatic place information output in the case that ID to be matched with the network ID checked through the information checking section 420 is stored into the automatic place information output ID lists.

On the other hand, the discriminating section 420 in another embodiment of the present invention transmits the network ID information checked through the information checking section 420 and the identification information of the wireless terminal 110 to the information processing server 100, and may check whether the network ID information checked through the information checking section 420 from the information processing server 100 is the network ID information already registered by the automatic place information output.

The information processing section 400 in an embodiment of the present invention automatically outputs the place information corresponding to the place in the case that the network ID information checked through the information checking section 420 from the information processing server 100 is the network ID information already registered by the automatic place information output in the result discriminated by the discriminating section. The information processing section 400 transmits the network ID information to the information processing server 100, receives at least one of the place identification information and place information corresponding to the network ID information from the information processing server 100 and therefore outputs them on the screen through the outputting section 480, and requests the automatic place information output registration for the place to the user in the case that the network ID information checked through the information checking section 420 from the information processing server 100 is not the network ID information already registered by the automatic place information output in the result discriminated by the discriminating section.

The information processing section 400 may further transmit at least one identification information for the wireless terminal 110 on transmitting the network ID information to the information processing server 100.

In addition, when the user's wireless terminal 110 revisits the place registered by the automatic place information output, the information processing section 400 automatically outputs the place information corresponding to the revisited place.

Further, the information processing section 400 outputs advertisements to the inside of the place information or a upper or lower region outputted with the place information on outputting the place information to the wireless terminal 110. In this case, the advertisement includes local advertisements in the region located with the wireless terminal 110, is directly requested by the operator for the place or is provided by advertisers.

When the information processing section 400 requests the automatic place information output registration for the place and therefore the automatic place information output registration-approval for the user is inputted, the registering section 450 in an embodiment of the present invention registers the automatic place information output for the place.

The registering section 450 adds the network ID information registered and recognized from the user to the automatic place information output ID lists disposed in the wireless terminal 110, or transmits at least one identification information for the wireless terminal 110 and the network ID information registered and recognized from the user to the information processing server 100 on the communication network, and therefore requests the automatic place information output registration for the places, on registering the automatic place information output for the place.

In addition, the registering section 450 receives the place information for the place from the information processing server 100 and therefore may further register and stores the received place information into the automatic place information output ID lists, on adding the network ID information registered and recognized from the user to the automatic place information output ID lists disposed in the wireless terminal 110.

On the other hand, when the network ID information or the place identification information, the place information set to the communication network equipment disposed in the places are changed, the registering section 450 changes ID formation or the place identification information, the place information on the automatic place information output network ID information lists.

The whole or some functions of the discriminating section 430, the information checking section 420, the information processing section 400, the registering section 450 of configurations of the wireless terminal 110 shown are implemented in a kind of programs disposed in the wireless terminal 110, that is, an automatic place information output application type. In this case, the applications check the communication network ID information accessed with the wireless terminal 110 at current places, discriminate whether the checked network ID information is the network ID information already registered by the automatic place information output, automatically output the place information corresponding to the places in the case that the checked network ID information is the network ID information already registered by the automatic place information output, transmit the network ID information to the information processing server 100 in the case that the checked network ID information is not the network ID information already registered by the automatic place information output, receive at least one of the place identification information and the place information corresponding to the network ID information from the information processing server 100 and therefore output the received information on the screen, request the automatic place information output registration for the places to the user, and process the automatic place information output registration for the place when the automatic place information output registration-approval for the user is inputted through the key inputting section 470, and registers the automatic place information output.

Hereinafter, the process for registering ID set to the communication network device 125 disposed in the places visited with the user's wireless terminal 110 into the applications disposed in the user's wireless terminal 110 or the information processing server 100 on the communication network will be described in detail using the above-described information processing system.

The applications performs the functions and roles of the configurations within the wireless terminal 110 in FIG. 4, thereby to omit names of the configurations within a separable wireless terminal 110 and describe processing processes through the applications.

Figure 5:
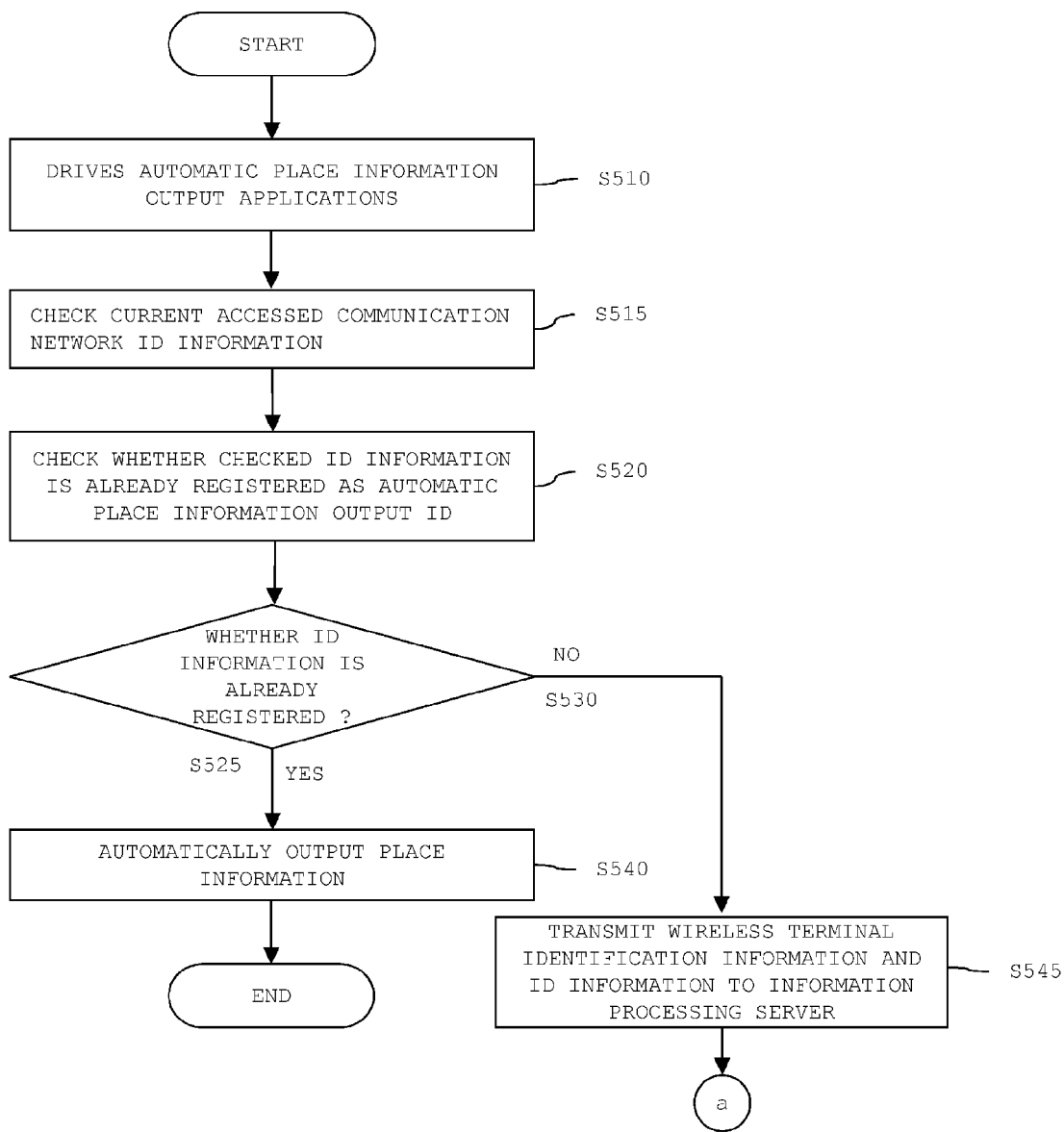
FIG. 5 shows a process for requesting visiting place communication network ID registration at the user's wireless terminal according to an embodiment of the present invention.

FIG. 5 shows a requesting process for registering a visiting place communication network ID at the user's wireless terminal 110 according to an embodiment of the present invention.

Firstly, it drives the automatic place information output applications already stored into the memory 460 from the user's wireless terminal 110(S510).

The applications check the communication network ID information accessed with the wireless terminal 110 at current place(S515).

The information checking section 420 checks the network ID information set through Wi-Fi setting applications in conjunction with the Wi-Fi setting applications disposed in the wireless terminal 110, and therefore may check the communication network ID information accessed with the wireless terminal 110 at current place.

When the communication network ID information accessed with the wireless terminal 110 at current place is checked, the applications compare the network ID on the automatic place information output ID lists already stored into the memory 460 with the checked network ID, check whether ID to be matched with the checked network ID is stored into the automatic place information output ID lists, and discriminate whether the communication network ID information accessed with the wireless terminal 110 at current places is the network ID information already registered by the automatic place information output(S520).

In addition, the applications transmit the checked network ID information and the identification information of the wireless terminal 110 to the information processing server 100, receive whether the checked network ID information is the network ID information already registered by the automatic place information output from the information processing server 100 and therefore discriminate whether the communication network ID information accessed with the wireless terminal 110 at current place is the network ID information already registered by the automatic place information output(S520).

When the communication network ID information accessed with the wireless terminal 110 at current place is the network ID information already registered by the automatic place information output(S525), the applications extract the place information connected and already stored to the ID on the automatic place information output ID lists and output the extracted place information on the screen, or receive the place information corresponding to the ID from the information processing server 100 and therefore output the received place information on the screen(S540).

When the communication network ID information accessed with the wireless terminal 110 at current place is not the network ID information already registered by the automatic place information output(S530), the applications transmit the ID information to the information processing server 100 on the communication network and therefore request the automatic place information output registration for the ID information(S545).

In this case, the applications may further transmit the identification information of the wireless terminal 110 to the information processing server 100 on transmitting the ID information to the information processing server 100 on the communication network.

Figure 6:
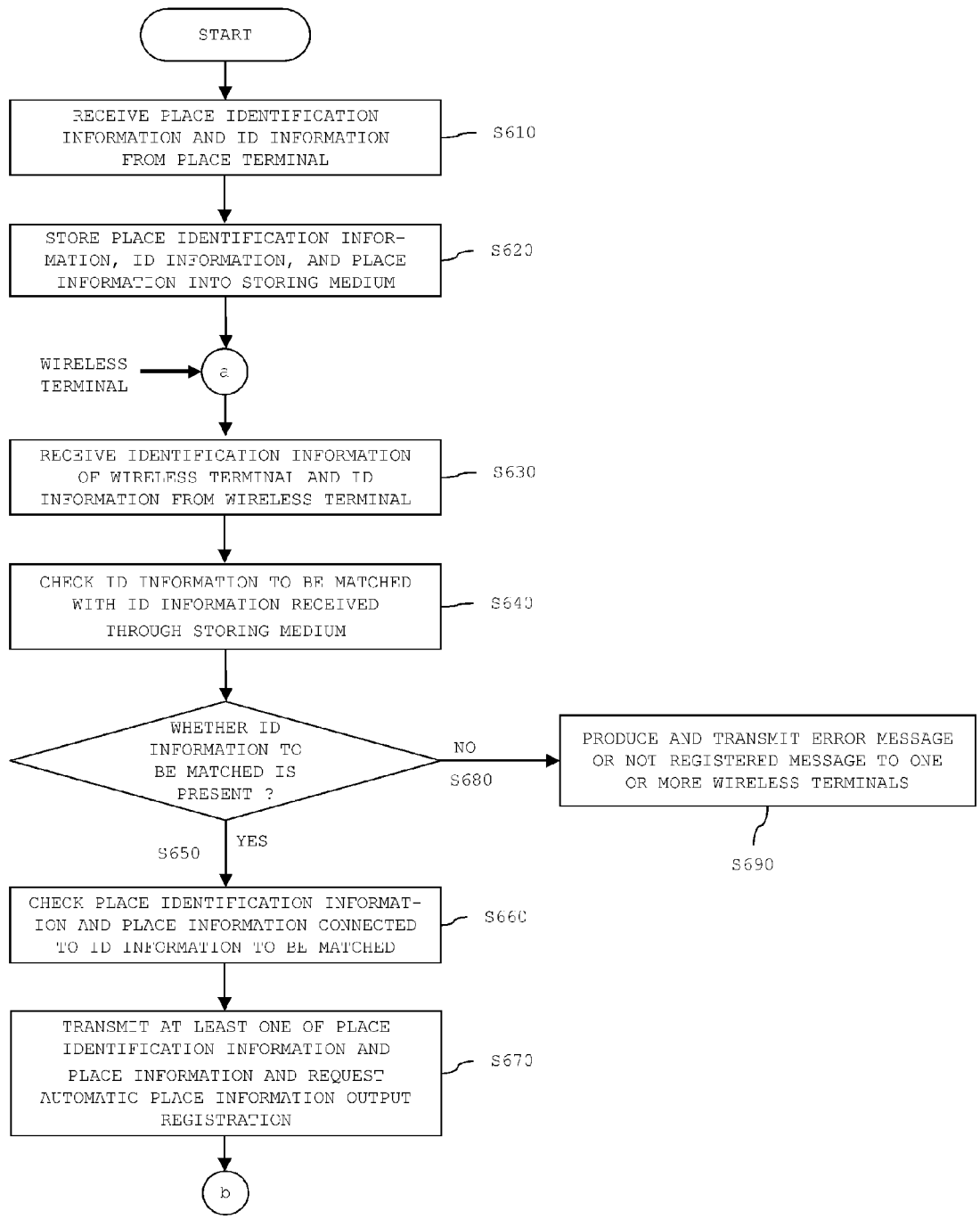
FIG. 6 shows a process for requesting a ID registration user approval at an information processing server according to an embodiment of the present invention.

FIG. 6 shows a process for requesting an ID registration user approval at the information processing server 100 according to an embodiment of the present invention.

The place terminal side transceiver 205 of the information processing server 100 receives the place identification information and the network ID information set to the communication network device 125 disposed in the place from the place terminal 120 disposed in the place, and further receive the place information that want to be provided to the user's wireless terminal 110 by the operator of the place from the place terminal 120, from case to case(S610).

The storing section 210 of the information processing server 100 stores at least one place identification information per a place receiving from each place terminal 120, the network ID information set to the communication network device 125 disposed in each place, and the place information corresponding to each place, connected by the place terminal side transceiver 205 into the storing medium 105(S620).

The wireless terminal side transceiver 205 of the information processing server 100 receives the communication network ID information accessed with the wireless terminal 110 through the applications disposed in the user's wireless terminal 110(S620).

In this case, the wireless terminal side transceiver 205 further receives the identification information of the wireless terminal 110 on further transmitting the identification information of the wireless terminal 110 in the application disposed in the user's wireless terminal 110.

Then, the information checking section 220 of the information processing server 100 checks the network ID information to be matched with the communication network ID information received by the wireless terminal side transceiver 205 through the first storing medium 105(S640).

When network ID information to be matched with the communication network ID information received by the wireless terminal side transceiver 205 is present(S650), the information checking section 220 checks at least one of the place identification information and the place information connected to the checked network ID information(S660).

The information checking section 220 checks the place identification information only connected to the network ID information, the place information only connected to the network ID information, or the place identification information and place information connected to the network ID information, according to an embodying scheme.

The registering requesting section 225 of the information processing server 100 transmits at least one of the place identification information and place information checked through the information checking section 220 to the applications disposed in the wireless terminal 110 through the wireless terminal side transceiver 215 and requests the automatic place information output registration for the place to the applications(S670).

The registering requesting section 225 may transmit the place identification information only, the place information only, and the place identification information and the place information, checked through the information checking section 220 to the applications disposed in the wireless terminal 110, by one skilled in the art.

When network ID information to be matched with the communication network ID information received by the wireless terminal side transceiver 205 through the first storing medium 105 is present in the result checked by step S640(S680), the information processing server 100 produces error messages or not registered messages and then transmits the messages to the wireless terminal 110 through the wireless terminal side transceiver 205(S690).

Figure 7:
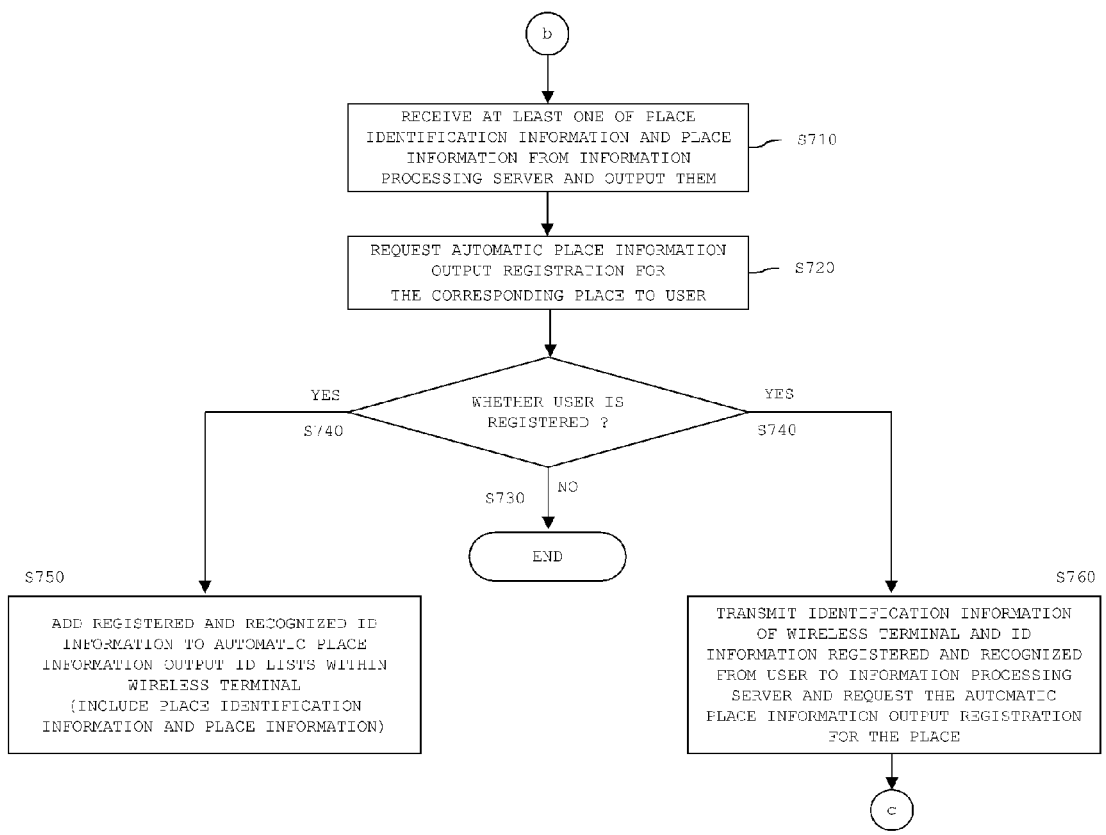
FIG. 7 shows a process for requesting a visiting place communication network ID itself registration or information processing server registration at the user's wireless terminal according to an embodiment of the present invention.

FIG. 7 shows a process for requesting a visiting place communication network ID itself registration or information processing server 100 registration at the user's wireless terminal 110 according to an embodiment of the present invention.

Firstly, the applications disposed in the wireless terminal 110 receive at least one of the place identification information and place information corresponding to the transmitted network ID information from the information processing server 100 and therefore output the received information on the screen through the outputting section(S710), and request the automatic place information output registration for the corresponding places to the user through the outputted screen(S720).

When registration-approval values corresponding to the automatic place information output registration requesting are selected or inputted from the user through the key inputting section 470(S740), it adds the network ID information registered and recognized from the user to the automatic place information output ID lists disposed in the wireless terminal 110(S750), or it transmits at least one identification information for the wireless terminal 110 and the network ID information registered and recognized from the user to the information processing server 100 on the communication network and therefore requests the automatic place information output registration for the places (S760).

At this time, the applications receive the place information for the place from the information processing server 100 and therefore may further register and stores the received place information into the automatic place information output ID lists, on adding the network ID information registered and recognized from the user to the automatic place information output ID lists disposed in the wireless terminal 110.

When registration-approval values corresponding to the automatic place information output registration requesting are selected or inputted from the user through the key inputting section 470(S730), it ends a process.

Figure 8:
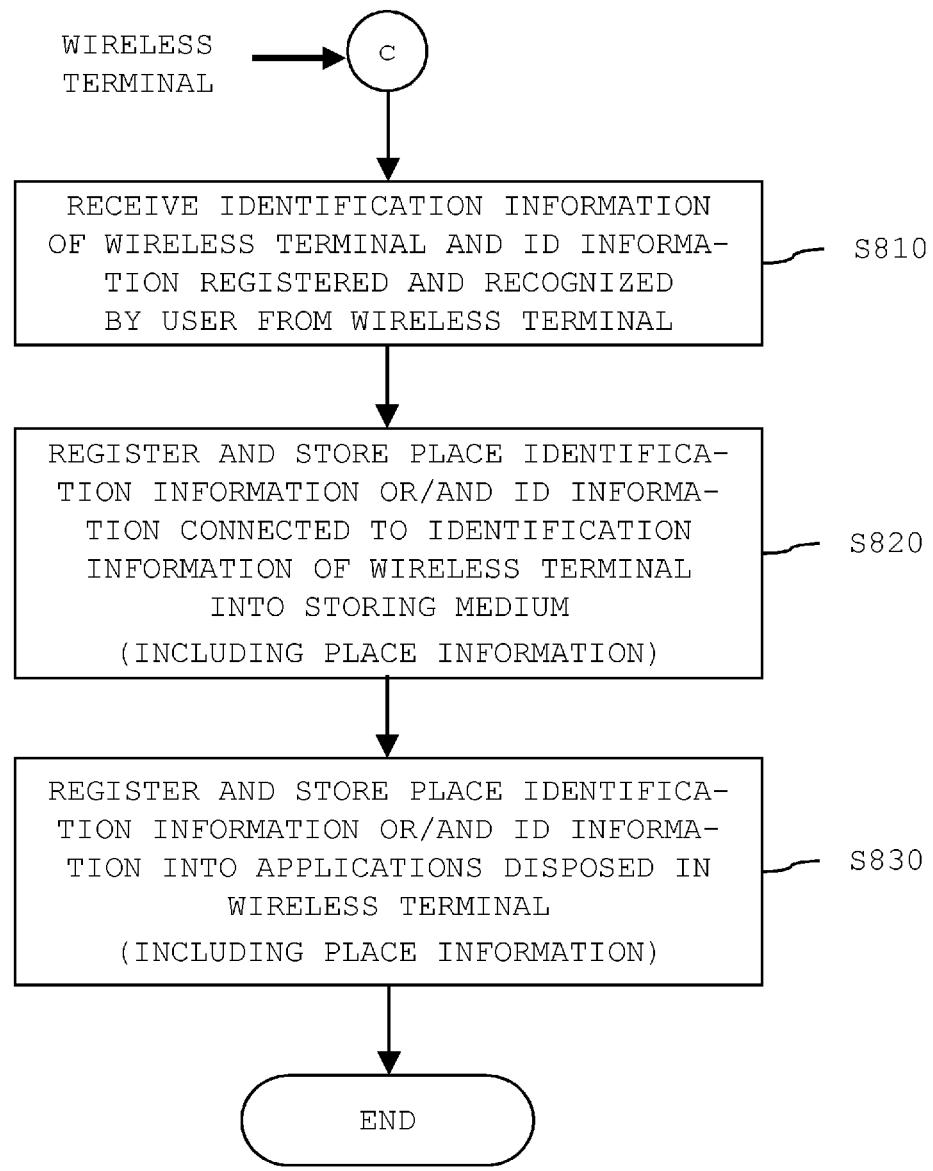
FIG. 8 shows a process for processing visiting place communication network ID registration at the information processing server according to an embodiment of the present invention.

FIG. 8 shows a process for processing visiting place communication network ID registrations at the information processing server 100 according to an embodiment of the present invention.

Firstly, the wireless terminal side transceiver 205 of the information processing server 100 receives at least one the identification information for the wireless terminal 110 for the automatic place information output registration requesting and the network ID information registered and recognized from the user through the applications disposed in the wireless terminal 110(S810).

Further, the registering processing section 230 of the information processing server 100 registers and stores the place identification information or/and the network ID information set to the communication network device 125 disposed in the places connected to the identification information of the wireless terminal 110 into the second storing medium 105(S820), and/or registers and stores the place identification information or/and the network ID information set to the communication network device 125 disposed in the place connected to the identification information of the wireless terminal 110 into the applications disposed in the wireless terminal 110(S830).

The registration processing section 230 is connected to the applications disposed in the wireless terminal 110 through the communication network, then requests so that at least one information of the place identification information and the network ID information set to the communication network device 125 disposed in the places into automatic place information output network ID lists managed by the applications is stored, and requests so that the place information is further stored from case to case.

Figure 9:
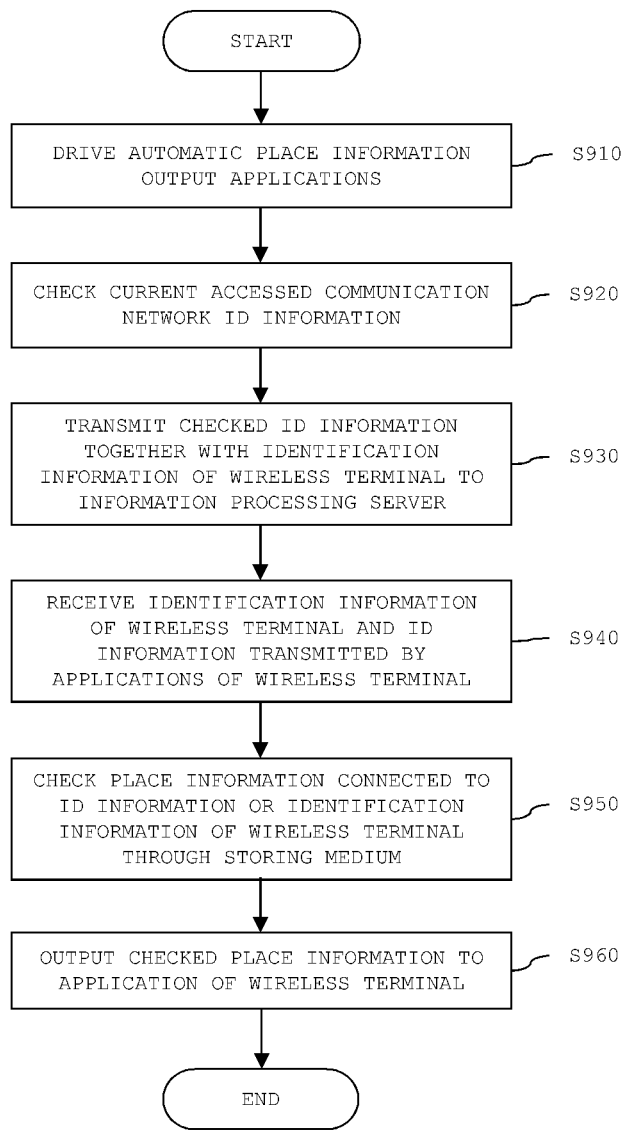
FIG. 9 shows a process for providing place information when the user's wireless terminal revisits places at the information processing server according to an embodiment of the present invention.

FIG. 9 shows a process for providing the place information when the user's wireless terminal 110 revisits places at the information processing server 100 according to an embodiment of the present invention.

FIG. 9 shows a process for automatically outputting the place information when the user revisits the places completed with the automatic place information output registration through FIG. 5 to FIG. 8.

Firstly, it drives the automatic place information output applications already stored into the memory 460 from the user's wireless terminal 110 (S910).

The applications check the communication network ID information accessed with the wireless terminal 110 at current place(S920).

One of embodiments of the present invention, that is, in case of using the automatic place information output network ID lists by the applications, although not shown in the drawing due to the duplication with FIG. 5, when the communication network ID information accessed with the wireless terminal 110 at current place is checked, the applications compare the network ID on the automatic place information output ID lists already stored into the memory 460 with the checked network ID, check whether ID to be matched with the checked network ID is stored into the automatic place information output ID lists, discriminate whether the communication network ID information accessed with the wireless terminal 110 at current place is the network ID information already registered by the automatic place information output, and output the place information on the screen according to the discriminating results.

One of embodiments of the present invention, that is, in case of automatically outputting the place information by the information processing server 100, the applications transmits ID information checked at step S920 together with the identification information of the wireless terminal 110 to the information processing server 100(S930).

The place information processing section 235 of the information processing server 100 receives the identification information of the wireless terminal 110, and the communication network ID information accessed with the wireless terminal 110 by the applications through the wireless terminal side transceiver 205(S940).

Then, the place information processing section 235 checks at least one of the network ID information and the place identification information connected to the identification information of the wireless terminal 110 through the second storing medium 105, checks the place information, corresponding to the place, connected to the network ID information or the place identification information through the first storing medium 105(S950), and outputs the checked place information to the wireless terminal 110(S960).

The place information processing section 235 is connected to the applications disposed in the user's wireless terminal 110 through the communication network and then outputs the place information corresponding to the revisited places to the wireless terminal 110 through the applications, from case to case.

According to an embodiment of the present invention, the present invention may solve inconvenience that should input search keywords for visiting places after the users in full access the portal site and that again should search the search results, that the user wants, of many search results outputted through the portal site by receiving in real time the place information for the place visited by the user without separable searches.

In addition, the place information provided to the user's wireless terminal may be provided as the received place information as information having high practicality, that the operator of the corresponding place want to provide, thereby to solve problems for non-efficient information providing that the operator of the place registers the place information that wants to be provided to the user visiting the place into the portal site in past and therefore the user searches M information for the corresponding place by search results.

What is claimed is:
1. An information processing system, comprising:
a place terminal side transceiver for receiving place identification information and network ID information set to a communication network device disposed in each of places from a terminal disposed in the places;
a storing section connecting and storing the place identification information of each of the places, the network ID information set to the communication network device disposed in each of the places, and place information corresponding to each of the places into a storing medium;
a wireless terminal side transceiver for receiving identification information of a wireless terminal and ID information of communication network accessed with the wireless terminal by using an application equipped in a user's wireless terminal;
an information checking section firstly checking the network ID information to be matched with the ID information received by the wireless terminal side transceiver by using the storing medium, and secondly checking at least one of the place identification information and the place information connected to the firstly checked network ID information;
a registering requesting section transmitting at least one of the place identification information and the place information checked in the information checking section by the application equipped in the wireless terminal, and requesting automatic output registration of the place information for the place;
a registering processing section processing to register at least one of the place identification information and the network ID information set to the communication network device disposed in the place, if registration-approval information corresponding to request of the automatic output registration is received by the application equipped in the wireless terminal,
wherein the wireless terminal requests an automatic output of the place information with user's approval for the places when the user's wireless terminal visits the corresponding places, and a place processing section processes the automatic output of the place information on the wireless terminal corresponding to revisited place when the user's wireless terminal revisits the registered places according to the registration of the automatic output of the place information, wherein the place information corresponding to the revisited place is received by the place terminal side transceiver from the place terminal and comprises place information wanted to be provided into the user's wireless terminal by an operator of the revisited place.

2. The information processing system according to claim 1, wherein, the place processing section outputting the place information corresponding to the place connected to the network ID information or the place identification information to the wireless terminal after checking at least one of the network ID information or the place identification information connected to the identification information of the wireless terminal on receiving the identification information of the wireless terminal and the communication network ID information accessed with the wireless terminal by the applications disposed in the user's wireless terminal revisiting the place.

3. The information processing system according to claim 1, wherein the storing medium is disposed in at least one of the information processing system, a server on a communication network, and the user's wireless terminal.

4. The information processing system according to claim 1, wherein the registering processing section stores at least one of the place identification information and the network ID information set to the communication network device disposed in the place into the storing medium disposed in at least one of the information processing system, a server on a communication network, and the user's wireless terminal.

5. The information processing system according to claim 1, wherein the registering requesting section requests the automatic place information output registration for the place to the applications.

6. The information processing system according to claim 1, wherein the registering processing section registers at least one of the place identification information and the network ID information set to the communication network device disposed in the place into the applications.

7. The information processing system according to claim 1, wherein the registering processing section registers and stores the connections between at least one of the place identification information and the network ID information set to the communication network device disposed in the place and the identification information of the wireless terminal.

8. The information processing system according to claim 1, wherein the registering processing section registers and stores the connections between at least one of the place identification information and the network ID information set to the communication network device disposed in the place and the place information corresponding to the place.

9. The information processing system according to claim 1, further comprising a place information processing section outputting the place information corresponding to a revisiting place to the wireless terminal through the application disposed in the user's wireless terminal on revisiting the place by the user's wireless terminal.

10. The information processing system according to claim 1, further comprising an information changing section changing at least one of the stored or registered network ID information and the place identification information on changing the network ID information set to the communication network device disposed in the place or the place identification information.

11. The information processing system according to claim 1, wherein the place information includes at least one of place abstract information, place guide map information, information page link information for the place, place information storage location information, various menu information provided from the place, various content information provided from the place, promotion information for the place, event information at the place, advertisement information to be outputted inside the place information or to a upper or lower region outputted with the place information, and ticket or coupon information available at the place.

12. The information processing system according to claim 11, wherein the place processing section outputs advertisements to be outputted inside the place information or to the upper or lower region outputted with the place information on outputting the place information to the wireless terminal.

13. An information processing method, comprising:
storing place identification information and network ID information set to a communication network device disposed in a place, connected to place information corresponding to the place into a storing medium;

if identification information of a user's wireless terminal and the network ID information are received by a application equipped in the user's wireless terminal, checking the network ID information to be matched with the network ID information received by an application through the storing medium, and checking at least one of the place identification information and the place information connected to the checked network ID information;

requesting automatic output registration of place information for the place by transmitting at least one of the checked place identification information and place information from a server to the application processing automatic output of the place information on the wireless terminal corresponding to revisited place when the user's wireless terminal revisits the registered places according to a registration of the automatic output of the place information, wherein the place information corresponding to the revisited place is received by the place terminal side transceiver from the place terminal and comprising place information wanted to be provided into the user's wireless terminal by the operator of the revisited place.

14. The information processing method according to claim 13, wherein the checking include
checking communication network ID information accessed with the wireless terminal in the applications disposed at the user's wireless terminal;
discriminating whether the checked network ID information is the network ID information already registered by automatic place information output in the applications;
automatically outputting the place information corresponding to the place when the checked network ID information is the network ID information already registered by automatic place information output in the applications, transmitting the identification information for the wireless terminal and network ID information the to the server when the checked network ID information is not the network ID information already registered by automatic place information output in the applications; and
checking the network ID information to be matched with the network ID information transmitted by the applications from the server through the storing medium, and checking the at least one of place identification information and place information connected to the checked network ID information.

15. The information processing method according to claim 13, further comprising processing the automatic place information output registration for the place in the applications.

16. The information processing method according to claim 15, wherein the processing of the automatic output registration further includes
transmitting a user's registration-approval information to the server in the applications;
registering and storing the place identification information and/or the network ID information set to the communication network device disposed in the place connected to the identification information of the wireless terminal at the server into a second storing medium; and
registering and storing the network ID information into automatic place information output network ID information for the place in the applications.

17. The information processing method according to claim 15, wherein the processing of the automatic output registration further includes
checking the user's registration-approval in the applications; and
registering and storing the network ID information into the automatic place information output network ID information for the place in the applications.

18. The information processing method according to claim 13, further comprising automatically outputting the place information corresponding to a revisiting place to the wireless terminal in the application disposed in the user's wireless terminal when the user's wireless terminal revisits the place registered by the automatic place information output.

19. The information processing method according to claim 13, wherein the place information includes at least one of place abstract information, place guide map information, information page link information for the place, place information storage location information, various menu information provided from the place, various content information provided from the place, promotion information for the place, event information at the place, advertisement information to be outputted inside the place information or to the upper or lower region outputted with the place information, and ticket or coupon information available at the place.

20. A non-transitory computer-readable recording medium for recording programs to perform a method comprising:
storing place identification information and network ID information set to a communication network device disposed in each of places, connected to place information corresponding to each of the places into a storing medium;
if identification information of a user's wireless terminal and the network ID information are received by an application equipped in the user's wireless terminal, checking the network ID information to be matched with the network ID information received by an application through the storing medium, and checking at least one of the place identification information and the place information connected to the checked network ID information;
requesting an automatic output registration of the place information for the place by transmitting at least one of the checked place identification information and place information from a server to the application, and
processing an automatic output of the place information on the wireless terminal corresponding to revisited place when the user's wireless terminal revisits the registered places according to the registration of the automatic place information output,
wherein the place information corresponding to the revisited place is received by the place terminal side transceiver from the place terminal and comprises place information wanted to be provided into the user's wireless terminal by an operator of the revisited place.

\* \* \* \* \*